R. WASHBURN & A. W. MARTIN.
HOLDER FOR STRAINERS AND THE LIKE.
APPLICATION FILED MAY 26, 1913.
1,149,878.
Patented Aug. 10, 1915.
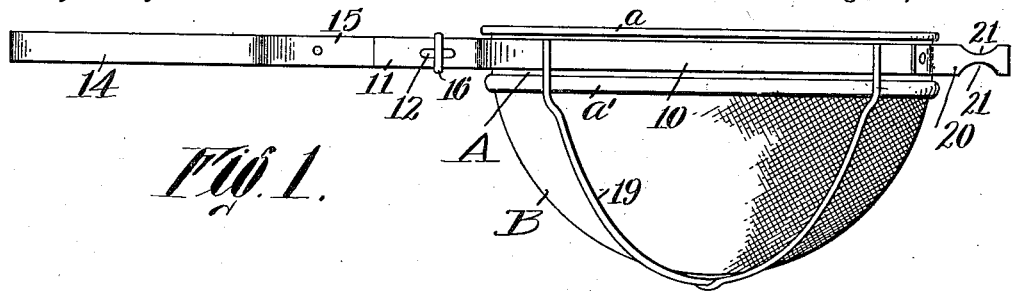
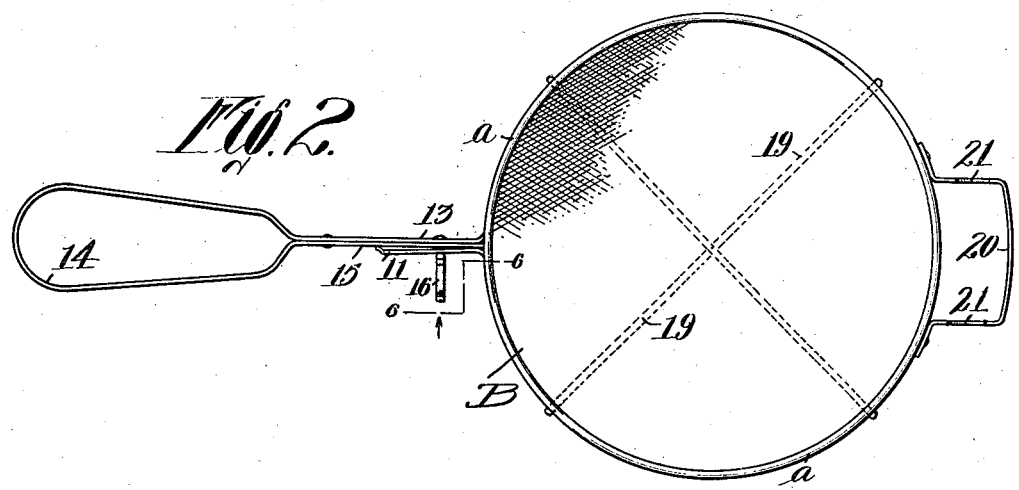
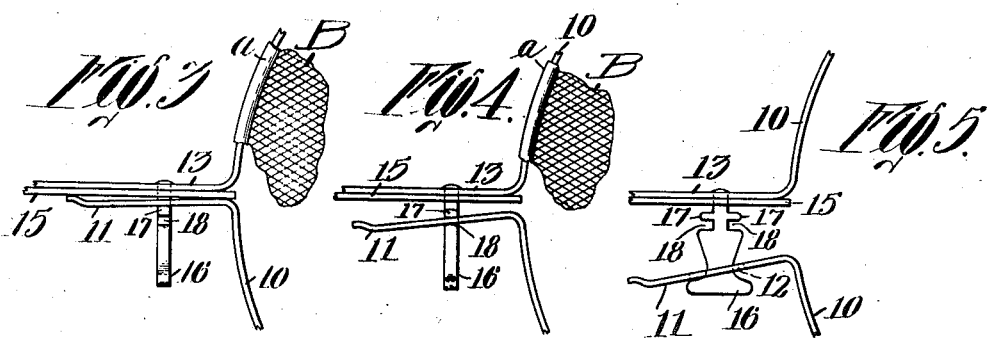
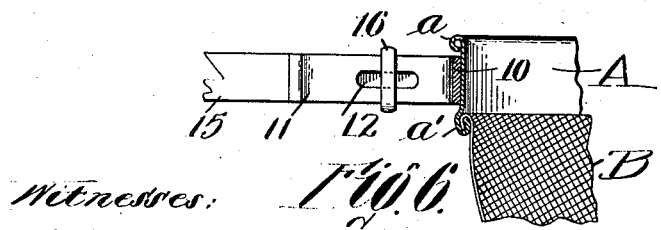
Witnesses:
C. F. Wesson
E. M. Allen
Inventors:
R. Washburn
A. W. Martin
by Attorneys
Southgate & Southgate

UNITED STATES PATENT OFFICE.

REGINALD WASHBURN AND ALBERT W. MARTIN, OF WORCESTER, MASSACHUSETTS, ASSIGNORS TO WIRE GOODS COMPANY, OF WORCESTER, MASSACHUSETTS, A CORPORATION OF MASSACHUSETTS.

HOLDER FOR STRAINERS AND THE LIKE.

1,149,878.  Specification of Letters Patent.  Patented Aug. 10, 1915.

Application filed May 26, 1913. Serial No. 769,820.

*To all whom it may concern:*

Be it known that we, REGINALD WASHBURN and ALBERT W. MARTIN, citizens of the United States, residing at Worcester, in the county of Worcester and State of Massachusetts, have invented a new and useful Holder for Strainers and the like, of which the following is a specification.

This invention relates to strainers and similar kitchen utensils.

The principal object of this invention is to provide a kitchen strainer or similar article with a removable handle or holding device of an inexpensive and yet durable construction so that the strainers can be made as separate articles of manufacture without adding the complication of manufacturing a handle on each strainer, thus materially simplifying and cheapening the cost of the strainer without reducing its strength and durability, and at the same time providing an effective handle and holding device therefor of such a superior character that it will outlast many strainers. Thus after one handle is purchased, it can be used with a large number of strainers, one after the other as they wear out, or with a number of strainers of different mesh. In this way not only is the strainer itself improved materially and also cheapened in the cost of manufacture, but a plurality of these strainers, either of the same or different mesh, can be sold with a single handle for the price of the same number of strainers of a similar grade, each with its own handle. After these strainers are worn out they can be replaced at a very greatly reduced cost, the same handle being used with them indefinitely.

The invention also involves several improvements which coöperate with the main idea of the invention, including a construction by which a strainer having a simple, plain vertical top rim provided with an outwardly extending bead at its top, can be effectively held by friction so that the strainer can be manipulated as desired without loosening it or causing any rattling of the parts, and by which also a strainer constructed with a similar band except that it has an external bead at the bottom, can be held in the same way or can be held loosely so that the strainer can be caused to rotate in the handle for the purpose of facilitating the straining operation.

The invention also involves the provision of new and improved fastening devices for the holder; new and improved strengthening devices therefor; and other features and details of construction as will appear hereinafter.

Reference is to be had to the accompanying drawings in which,

Figure 1 is a side view of a strainer and holder constructed in accordance with this invention; Fig. 2 is a plan of a portion thereof with the parts in locked position; Fig. 3 is a similar view on enlarged scale; Figs. 4 and 5 are similar views showing the parts in two different positions; and Fig. 6 is a detail sectional view through the rim of the strainer and the end of the handle.

Referring to the drawings, it will be seen that the strainer proper is shown in an exceedingly simple form comprising a vertical substantially cylindrical sheet metal top rim A having a projecting bead $a$ at the top thereof and also a projecting bead $a'$ at the bottom thereof, both preferably extending entirely around the strainer. The bottom of the strainer is composed of woven wire or other foraminous material B in a hemispherical or other desired form. The top of this is secured to the rim by being bent in behind the upturned inner bottom flange back of the bead $a'$ so that this projecting bead serves to hold the top of the woven wire fabric, and it also serves another function, as will appear hereinafter. Thus the simple strainer is capable of being made in large quantities with great rapidity, as there is no complication due to the application of a handle thereto. The cost of the strainer itself is thus reduced and it is possible to make it at prevailing prices, of a higher character of construction and of a more durable nature than would be the case if the complication of adding the handle were necessary.

The holding means for the strainer is shown in a form comprising a circular band of metal 10 adapted to surround the rim of the strainer between the two beads thereof. The ends of this band consist of an integral projection 11 having a perforation 12 therethrough and an integral shank 13 forming a continuation of the band, both extending out radially. This shank 13 is separated at the end to form a handle portion 14, the extreme end 15 of which is then brought in against the shank and riveted to it, thus constituting a part thereof, materially strengthening the shank without material expense in manufacture or material.

Rotatably mounted on this shank is a locking device comprising a rotatable member 16 perpendicular to the shank and adapted to extend through the perforation 12. This member is shown as flat so that the elongated perforation 12 will have free play along it when it is in the position parallel with the top of the holder. When it is turned to a vertical position, however, a pair of shoulders 17 thereon engage the projection 11 on opposite sides of the perforation 12 and hold it firmly in position so that in this place the projection 11 virtually also constitutes a part of the shank.

When the device is applied to a strainer and the parts locked in the position just described, the strainer is held positively by the band surrounding it. In other words, the strainer is fixed to the band so that it cannot rattle or turn. If, however, it is desired that the strainer shall be capable of turning in the band to facilitate the operation of using it, the locking member is again turned to horizontal position and the projection 11 allowed to slip back part way along it until it comes to a pair of notches 18 therein, when the locking member is again turned to vertical position. When held in this way (as in Fig. 4) the strainer can be turned at will, but it cannot be removed from the holding device because the lower bead is larger than the inner diameter of the surrounding band 10. In many straining and sifting operations it is very convenient to rotate the strainer and this construction forms an ideal arrangement for that purpose.

When it is desired to remove the strainer entirely, the locking device is again turned to the horizontal position and the projection 11 allowed to spring back to its limiting position, as shown in Fig. 5. It will be seen, therefore, that with this construction, two very different ways of using the strainer are allowed, thus providing for the full efficiency of this widely used kitchen utensil. In this form, also, the holding device is further strengthened and the strainer efficiently protected against indentations and tearing by means of a metallic armor comprising two semi-circular bands 19 secured at their upper ends to the surrounding band 10 and secured to each other at the center. These are soldered, welded or otherwise fastened. They are shown in the form of half-round wires. It is to be noted that the bands 19 strengthen the surrounding band 10 by assisting in holding the parts in position when the ends of the band 10 are disconnected. A rest 20 is also provided at the end of the band, either formed of a separate piece or otherwise, as desired. This rest can be employed if desired for use in suspending the article from a hook or nail, and is provided with notches 21 on both sides so as to facilitate placing it over the edge of a dish or pan and holding it firmly in that position. It is mainly when held in this way that the rotary motion of the strainer is employed in practice.

In the article as shown the surrounding band, shank and handle are shown as formed of a single piece of flat metal. This affords a strong and durable device for the purpose intended, but it will be understood of course that other forms of metallic bands can be used, that different kinds of material can be used for the formation of the band and its connected parts and that many other modifications can be made without departing from the scope of the invention as expressed in the claims. Therefore, we do not wish to be limited in these respects, but What we do claim is:—

1. As an article of manufacture a holder for a circular strainer or the like comprising a circular band of metal having its ends bent therefrom radially and located adjacent to each other, one of said ends having a passage therethrough, and a stud rotatably mounted on the other end having a head for turning the same, said stud having shoulders for engaging the walls of said passage when turned to certain positions and having a pair of notches for receiving the walls of the passage and holding the band in two adjusted positions.

2. As an article of manufacture, a holder for a circular strainer or the like comprising a circular band of metal having its ends bent therefrom radially and adapted to meet each other, one of said ends constituting a shank on the band and the other a projection having a passage therethrough, and a stud rotatably mounted on the shank having a head for turning the same, said stud having shoulders for engaging the walls of said passage when turned to certain positions and having a pair of notches at a point between said shoulders and the head for receiving the walls of said passage and holding the band in two adjusted positions.

3. As an article of manufacture, a holder for a circular strainer or the like comprising a circular band having its ends separate from each other, detachable means for fastening said ends at a point adjacent to the band and a plurality of wires extending from the band on one side of said ends to the band on the other side of said ends and spaced from the bottom of the band, for strengthening the band and assisting in holding the parts in position when the ends are disconnected.

4. As an article of manufacture a holder for a circular strainer or the like comprising a circular band of metal having a radial handle extending therefrom connected therewith by a shank forming a part thereof, said handle and shank constituting one end of said band, the other end of the band being also bent radially to form a projection therefrom near said shank, and means on the shank for holding the projection in two definite positions for the purpose of causing the band to assume two conditions in each of which it has a definite diameter of different lengths.

In testimony whereof we have hereunto set our hands, in the presence of two subscribing witnesses.

REGINALD WASHBURN.
ALBERT W. MARTIN.

Witnesses:
ALBERT E. FAY,
C. FORREST WESSON.